United States Patent Office 3,235,642
Patented Feb. 15, 1966

3,235,642
PROCESS OF EXTRUDING AN AQUEOUS DISPERSION CONTAINING VISCOSE AND AN ACRYLONITRILE POLYMER
Richard N. Blomberg, Wilmington, Del., assignor to E. I. du Pont de Nemours & Company, Wilmington, Del., a corporation of Delaware
No Drawing. Filed July 24, 1962, Ser. No. 212,131
4 Claims. (Cl. 264—182)

This invention relates to compositions of acrylonitrile polymers and to shaping of them into articles, such as filaments or films, by extrusion. This application is a continuation-in-part of application Serial No. 512,591 filed June 1, 1955, now U.S. Patent 3,087,903.

Conventional processes of extruding acrylonitrile polymers are complicated by necessity of polymer purification, solution, and high-temperature treatment. The relatively difficult solubility of acrylonitrile polymers containing high percentages of acrylonitrile has limited development of methods for preparing shaped articles from them.

An object of the present invention is formation of novel dispersions of acrylonitrile polymers. A further object is production of self-supporting articles of novel composition from dispersions of acrylonitrile polymers. Other objects, together with means and methods for accomplishing the various objects, will be apparent from the following description.

In general, the objects of the present invention are accomplished through production and use of disperse compositions containing both viscose and acrylonitrile polymers. The invention comprehends particularly combination of a stable aqueous dispersion of an acrylonitrile polymer in which up to about one-fourth of the total weight of the dispersion is acrylonitrile polymer with a viscose solution containing up to about seven and one-half percent of free caustic by weight (calculated as sodium hydroxide). In the resultant composition the viscose apparently serves as a sort of matrix for the dispersed particles of acrylonitrile polymer, thus preserving the integrity of the product even upon extrusion; greater content of acrylonitrile polymer is conducive to coagulation, and higher concentration of free caustic fosters occurrence of agglomerates, either of which phenomena is detrimental to successful formation of extruded articles.

As used here, the term "viscose" has its customary meaning. It signifies the product of reacting cellulose with caustic (i.e., aqueous alkali-metal hydroxide), then reacting the resulting alkali cellulose with carbon disulfide, and finally dissolving the cellulose xanthate so obtained in an excess of caustic solution. The viscose should contain approximately 4% to 12% cellulose by weight, with the optimum being in the middle of this recommended range; also the degree of xanthate substitution should be in the range of 0.3 to 1.0. Conventional viscoses are in the lower part of the range for each of these variables. The quantity "degree of xanthate substitution" is based on the number of positions available on the glucose ring for substitution. As there are three of these (hydroxyl groups) in each glucose unit, the maximum degree of substitution has a value of 3.0; however, as suggested, the average number of xanthated hydroxyl groups per molecule of cellulose used here should be from about 10% to a little over 30% of the maximum.

An "acrylonitrile polymer" here is a substance of high molecular weight containing repeating

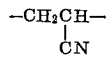

units throughout the molecular structure, thus including not only the homopolymer of acrylonitrile but also copolymers of acrylonitrile with other copolymerizable monomers, particularly ethylenically unsaturated monomers, so long as the polymerized acrylonitrile units predominate in weight and number in the copolymer. It also comprehends compositions containing, in addition to the polymer proper, small quantities (e.g., a few percent by weight) of other materials, whether monomeric or polymeric or whether usually considered beneficial or detrimental to conventional use of the polymer.

Acrylonitrile polymer dispersions obtained by conventional emulsion polymerization techniques can be used directly for mixing with viscose, if the concentration of polymer is below about 25%. The acrylonitrile polymer particles will obviously be smaller than the spinneret orifices employed and preferably will be, on the average, below ten microns. Improved results are obtained if the polymer dispersions are stabilized before combination with the viscose. For example, less subsequent agglomeration is observed if the polymer dispersion is deionized by passing through a cationic-exchange resin prior to mixing with the viscose. Still further improvement is obtained if sufficient ammonium hydroxide is added to the deionized dispersion to raise the pH to approximately 9–10. The molecular weight of the acrylonitrile polymer should be high enough to endow fibers or films made therefrom with desired physical characteristics of toughness, high softening temperature, and relative insolubility in ordinary solvents. Polymers of limited viscosity number (International Union of Pure and Applied Chemistry, J. Poly Sci., 8, p. 257, 1952) at least 2.0 are preferred. One of the primary advantages of this invention is the practicability of using in dispersed form polymers of such high molecular weight that conventional methods of shaping articles from them are limited severely by accompanying high viscosity.

After mixing, the resultant composition is extruded through a suitable orifice, slot, or the like to form a self-supporting article. Appropriate treatment of the extruded article coalesces the polymer particles into a continuous structure, which has greatly increased tensile strength after a suitable drawing. This treatment may regenerate cellulose from the viscose or not, as desired, the shaped article retaining a cellulosic component distributed throughout the resulting structure.

The practice of this invention is exemplified below in some detail, the text of the example, including for convenience an account of preparation of a suitable dispersion of acrylonitrile polymer and stabilization of it by addition of an anionic dispersing agent and subsequent deionization, as is generally preferable for improved continuity of extrusion through fine orifices. In the illustrations which follow, all parts are by weight unless otherwise indicated.

An aqueous dispersion of polyacrylonitrile is prepared in a stainless steel kettle from 0.05 part potassium persulfate, 1.0 part sodium "Lorol" sulfate (comprises a mixture of straight chain alkyl sulfonates predominantly lauryl and myristyl sulfates, which is a well-known anionic dispersing agent, 60 parts of water, and 45 parts of acrylonitrile, and the free space of the kettle is flushed with nitrogen gas and then sealed. After relatively mild agitation of the contents for 16 to 17 hours at 40° C., the resulting polymer dispersion contains 40% solid materials as is determined by evaporation of a portion. The dispersion has a uniform milky appearance and a pH of about 6.5. Sufficient "Amberlite" IR–120 (H), which is a well-known water-insoluble phenol-formaldehyde type of cationic exchange resin, is added to displace one-fifth the volume of dispersion. After stirring for about 5 minutes, the resin is removed by coarse filtration and water is added to reduce the non-aqueous content of the dispersion to about 20% by weight. The instantaneous pH, which is slightly under 2 at this stage, is raised to about 10 by the addition of one part of 28% ammonium hydroxide to each twenty parts of the dispersion.

A viscose solution containing 2.4% excess caustic (as sodium hydroxide) and about 5% cellulose by weight with a degree of substitution of 0.62 is stirred rapidly into the 20% dispersion. One volume of the viscose is used for each three volumes of the dispersion. The acrylonitrile polymer now constitutes about 15% of the total weight of the dispersion, the cellulose concentration is now about 1.25% and the free caustic present is thereby reduced to about 0.6%. The resulting composition is deaerated at a pressure equivalent to about 20 mm. of mercury for 20–30 minutes. This "spin mix" is extruded at a pressure of 10–15 pounds per square inch through a spinneret with five 0.008 inch holes at a rate of 30 yards per minute into a typical cellulose regeneration bath maintained at 25° C. and containing 9.4% sulfuric acid (1.84 specific gravity), 6.8% zinc sulfate hexahydrate, and 15.5% sodium sulfate decahydrate. After 5 seconds in this bath, the resulting filaments are exposed for 3–4 seconds to a bath containing 60% aqueous calcium thiocyanate heated to 110° C. They are washed with water and drawn at 140° C. to provide filaments with a tenacity of from 3–5 grams per denier and an elongation of 10–15%. The filaments have a density of approximately 1.2 grams per cc. and contain approximately 5.9% of cellulose or its derivatives.

In an attempt to follow the procedure of the above example using a viscose which has a degree of substitution of 0.4 and an initial acrylonitrile dispersion containing approximately 40% polyacrylonitrile, complete coagulation occurred. Reducing the concentration of acrylonitrile polymer to about 30% did not show any appreciable improvement. A spin mix prepared in a manner identical to that exemplified above, except that it contained more excess caustic, was less smooth, a few outsize agglomerates appearing clearly at a magnification of 500 diameters when the viscose used contained 5% excess caustic, and many agglomerates running several hundred times the diameter of the normal dispersed particles being visible when 7.5% excess caustic was present. When present in an appreciable number, say 20%, agglomerates of the order of 10 times the normal diameter are sufficiently outsized to raise the extrusion pressure appreciably, and another tenfold increase in either number or size of agglomerates renders the mix extrudable (at the indicated fineness) only with difficulty. A further increase also gives rise to discontinuity of spinning because of clogging of the spinneret orifice or breakage otherwise caused in the extruded filament.

Replacing the viscose described above, which has a 0.4 degree of substitution, with a viscose of 0.5 degree of xanthate substitution gave satisfactory results. However, the tendency toward mutual coagulation is higher at the higher concentrations and stabilization of the polyacrylonitrile dispersion is practically essential. For example, when the deionized polyacrylonitrile dispersion was not stabilized with ammonia, the addition of the viscose with the higher xanthate concentration led to appreciable agglomeration. Use of viscoses containing less than about 0.3 degree of xanthate produced weaker extruded filaments; this strength reduction is undesirable because the filament normally (i.e., in a continuous process) undergoes some forwarding tension before coalescence of the acrylonitrile polymer particles takes place to form the ultimate desired structure. Viscose containing cellulose xanthate with a degree of substitution of about 0.3 is somewhat more susceptible to agglomeration than the one described in the example. Once again, this effect is more noticeable when the ammonia stabilization of the polyacrylonitrile dispersion is omitted.

At the lower caustic concentrations an accompanying higher degree of xanthation of the cellulose is desirable to increase the stability of the viscose solution. For example, viscose having a degree of substitution of about 0.3 requires at least about 2.5% excess caustic to prevent gelling. This particular composition represents about the lower limit of xanthate substitution and free caustic recommended for use according to the present invention.

While the regenerating bath may be omitted, the coalescence step is then conductive to the formation of residual sulfur, which is undesirable for textile purposes. Presence of several percent of cellulose finely divided in the final article makes it less hydrophobic than customary acrylonitrile polymers lacking it, with consequent beneficial effect, especially in textile uses. Other hydrotropic salt solutions, e.g., zinc chloride, may replace calcium thiocyanate in the coalescing bath, or organic solvents or plasticizers for the acrylonitrile polymer may be used instead. Although not essential, bath temperatures above room temperature are generally used to carry out the process in a reasonable length of time; the temperature should remain somewhat below the boiling point of the bath to avoid turbulence, which is undesirable during the formation of the shaped article.

The product may be drawn before or after drying, as for increasing its tenacity in the well-known manner. Filaments and films formed according to this invention can be dyed or printed more readily than the available acrylonitrile polymers, possibly because of the cellulosic content or the somewhat more open structure so obtained. The advantages of producing filaments, films, ribbons, and the like with the aid of the present teachings will be apparent to those skilled in the art of shaping polymeric articles by extrusion.

What is claimed is:

1. The process of extruding an aqueous dispersion containing viscose and a predominantly acrylonitrile polymer containing about 1.25% cellulose xanthate calculated as cellulose, about 0.6% free caustic, and said viscose having a xanthate substitution of about 0.62 and said polymer constituting about 15% of the total weight of the dispersion into a bath effective to regenerate cellulose from the viscose to form a self-supporting article containing the finely divided acrylonitrile polymer.

2. Process of treating the product of claim 1 with a bath effective to coalesce the finely divided arcylonitrile polymer.

3. The process of claim 2 in which the active ingredient of the coalescing bath is calcium thiocyanate.

4. The process of extruding through a spinneret, a mixture of about 1 volume of a viscose solution and 3 volumes of an aqueous dispersion of a predominantly acrylonitrile polymer, the viscose solution containing 2.4% excess caustic and about 5% by weight of cellulose having a degree of xanthate substitution of 0.62 and the polymer dispersion containing about 20% by weight of solids; treating the extrudate with a bath effective to regenerate cellulose from the added viscose, and coalescing the finely divided acrylonitrile polymer.

References Cited by the Examiner

UNITED STATES PATENTS

| | | | |
|---|---|---|---|
| 2,726,220 | 12/1955 | Ogden | 260—17 |
| 2,796,656 | 6/1957 | Schappel et al. | 264—182 |
| 2,858,185 | 10/1958 | Schappel | 260—15 |
| 2,972,511 | 2/1961 | Bechtold | 264—182 |

JOSEPH L. SCHOFER, *Primary Examiner.*

JAMES A. SEIDLECK, *Examiner.*